Patented Mar. 23, 1926.

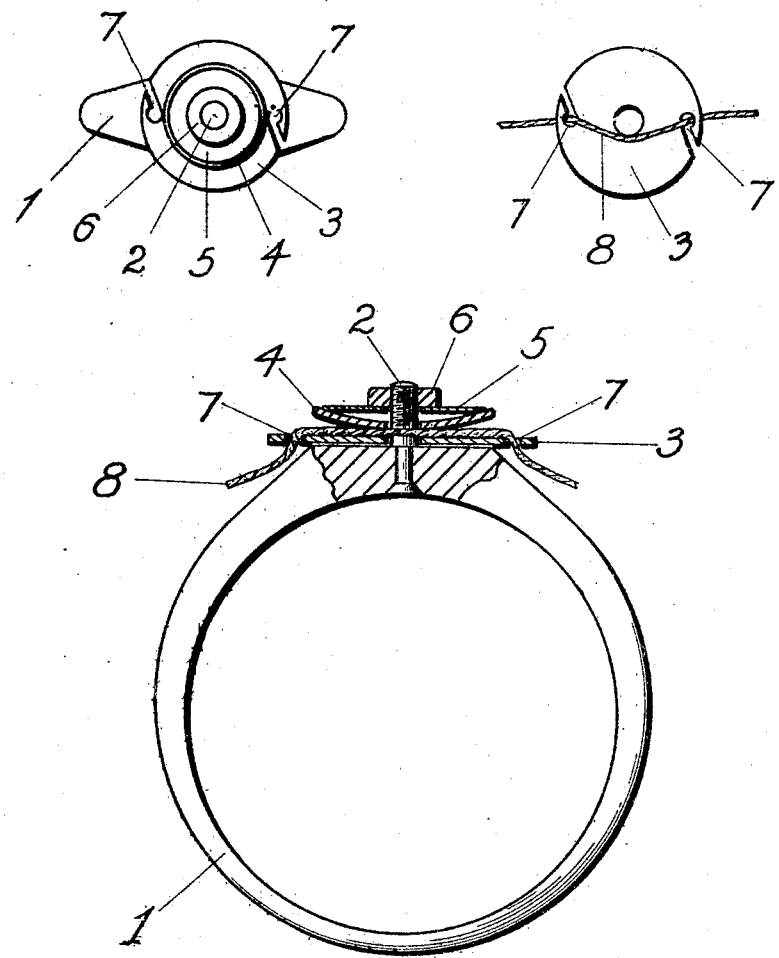

1,577,658

UNITED STATES PATENT OFFICE.

HELEN REBECCA REES, OF PORTLAND, OREGON.

FINGER RING FOR CROCHETING.

Application filed January 28, 1925. Serial No. 5,387.

*To all whom it may concern:*

Be it known that I, HELEN REBECCA REES, a citizen of the United States, residing at Portland, in the county of Multnomah and State of Oregon, have invented a new and useful Finger Ring for Crocheting, of which the following is a specification.

My invention relates to improvements in finger rings for crocheting in which a finger ring is provided with means for holding a thread under mechanical tension during crocheting.

The objects of my invention are to avoid the use of the helical spring hitherto customary, whereby the construction is simplified, the manufacturing cost reduced, the chances for entangling and breaking the thread greatly lessened, and the general appearance and utility of the ring greatly improved.

Other objects and advantages are to be found in the construction and arrangement of parts as will be described in the specification and particularly pointed out in the appended claims.

I attain these objects with the mechanism illustrated in the accompanying drawing, in which—

Fig. 1 is a plan view of the entire ring;

Fig. 2 is a side elevation of Fig. 1, a part of the upper portion being shown in section;

Fig. 3 is a detail of the lower, larger disk with the crochet thread inserted.

All views are shown on a greatly enlarged scale to depict the details of construction more clearly.

Similar numerals refer to similar parts throughout the several views.

The upper portion of the ring 1 is somewhat thickened similar to the well known signet rings. Riveted into this thickened portion is a radially extending stud 2 whose upper end is threaded. Over this stud is slipped a perfectly flat disk 3 resting on a correspondingly flat surface of the ring 1. On top of this disk is placed a convexo-concave disk 4 of somewhat smaller diameter than the disk 3. A flat disk spring 5 is thereupon placed over the stud 2 to cover the concave side of the underlying disk 4. A nut 6 on the stud 2 pressing against the disk spring completes the number of structural parts. The holes 7 in the larger disk 3 hold the thread 8 between the two disks while crocheting.

I am aware that it is old to use finger rings for producing mechanical tension in crochet threads and will therefore point out in detail wherein my improvement consists. Heretofore both the disks 3 and 4 were made slightly convexo-concave in order to have the edges separated for the easy insertion of the thread. I now make the larger disk perfectly flat which eliminates one stamping operation and thereby cheapens manufacture. With the disk being flat, the corresponding surface on the ring can also be made flat which also simplifies manufacture and reduces manufacturing cost to that extent. The curvature of the upper smaller disk has been considerably increased, which furnishes the same clearance at the edges as before without increasing the manufacturing cost. In addition thereto sufficient room on the concave side of the disk is gained to make the employment of a flat disk spring feasible and practicable. The employment of this flat disk spring eliminates the helical spring formerly employed between nut and disk. That in turn enables me to cut down the length of the stud to a minimum, eliminates the crevices between the coils of the spring which unavoidably collected dirt and were awkward to clean, and which frequently would cause the thread to be entangled and broken.

Having thus described my invention, it will be seen that my objects have been accomplished and, though I have shown the preferred form of construction, I reserve to myself the right to make minor changes, providing I do not violate the spirit and principle of my invention.

I claim:—

1. In a finger ring for crocheting, the combination of a ring, a stud extending radially from said ring, the surface of the ring around the stud being flattened, a large flat disk on the stud and resting on the flat surface of the ring, a convexo-concave disk of smaller diameter resting on the larger disk, a nut at the end of the stud, and a disk spring between the nut and the convexo-concave disk, the disk spring resting on the concave side of the convexo-concave disk, the edge of said disk spring extending substantially to the edge of the convexo-concave disk.

2. In a finger ring for crocheting, the combination of a ring, a stud, a nut at the end of the stud, thread guiding means between ring and nut, said thread guiding means comprising a small convexo-concave disk, a large flat disk, and holes in the edge of the large flat disk at diametrically opposite points, and a disk spring resting on the concave side of the convexo-concave disk and being backed by said nut.

3. In a finger ring for crocheting, a flat disk, a convexo-concave disk superimposed on the flat disk, and a flat disk spring, said flat disk spring resting on the concave side of the convexo-concave disk and normally leaving a space between said disk spring and the convexo-concave disk for the flexing of said disk spring.

Signed by me at Portland, Oregon, this 21st day of January, 1925.

HELEN REBECCA REES.